United States Patent [19]

Wild

[11] Patent Number: 5,702,740
[45] Date of Patent: Dec. 30, 1997

[54] EDIBLE GREETING CARD

[76] Inventor: Stephen Wild, 43 Twixt Hills Rd., St. James, N.Y. 11780

[21] Appl. No.: 622,700

[22] Filed: Mar. 26, 1996

[51] Int. Cl.⁶ .................. A23G 1/00; A23G 3/00
[52] U.S. Cl. .................. 426/87; 16/225; 40/642; 229/92.8; 229/100; 229/103.2; 426/104
[58] Field of Search .......... 426/87, 104; 229/92.8, 229/100, 103.2; 40/642; 16/225

[56] References Cited

U.S. PATENT DOCUMENTS

| | | | |
|---|---|---|---|
| 919,736 | 4/1909 | Loesch | 426/87 |
| 2,353,594 | 7/1944 | Seagren | 426/104 |
| 2,911,304 | 11/1959 | Wenger | 426/249 |
| 4,203,516 | 5/1980 | Stonoga et al. | 426/104 X |
| 4,578,273 | 3/1986 | Krubert | 426/87 |
| 4,975,137 | 12/1990 | Cross | 156/223 |

*Primary Examiner*—Leo B. Tentoni
*Attorney, Agent, or Firm*—Galgano & Burke

[57] ABSTRACT

An edible greeting card includes two edible leaves. Each leaf of the card is imprinted with a message and/or design which is suggestive of a celebratory event and each leaf is individually wrapped in clear plastic. The two leaves are coupled to each other by a hinge which may be formed from a strip of adhesive tape or from a folded cardboard member which embraces an edge of each leaf. The wrapped and hinged leaves are preferably packaged with at least one self-adhesive label upon which the sender may write a personal message and affix the label to one of the leaves. The edible greeting card and the self-adhesive label are preferably packaged in a plastic box which serves as the "envelope" for the greeting card.

20 Claims, 6 Drawing Sheets

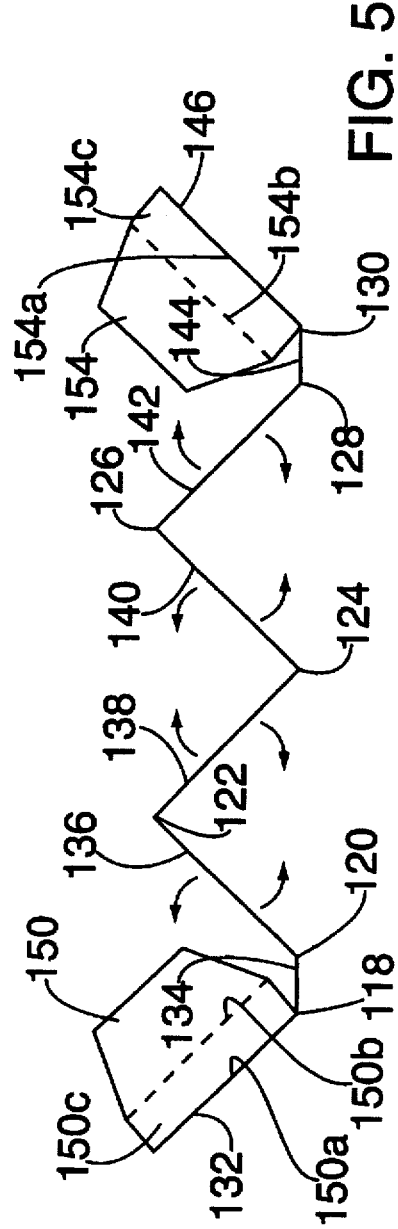
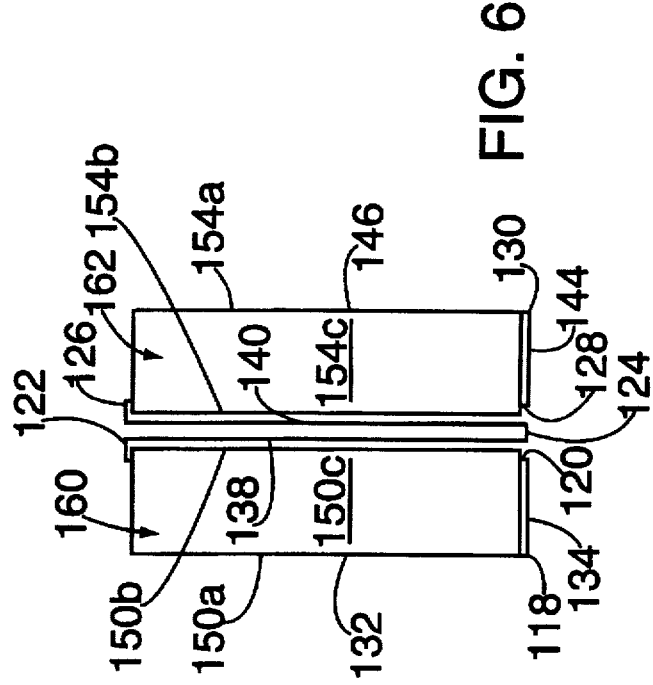

EDIBLE GREETING CARD

BACKGROUND OF THE INVENTION

1. Field of the Invention

The invention relates to greeting cards and to edible confections. More particularly, the invention relates to an edible greeting card and a method for making it.

2. State of the Art

Greeting cards have long been a popular device for celebrating an important event or holiday. Many different types of greeting cards are available and may be purchased with a pre-printed message such as "Happy Birthday", "Merry Christmas", etc.

Important events or holidays are also often celebrated with cakes or other types of edible confections. A birthday cake is the most common event-specific confection, but cakes are prepared for many different occasions. It is common and expected that an event-specific cake be decorated in such a way that the event is indicated on the cake with words and designs. Using various technologies, it is possible to create elaborate designs on cakes and other edible confections. Some of the methods used for decorating and/or imprinting edible products are disclosed in U.S. Pat. Nos. 2,353,594; 2,911,304; and 4,578,273.

Greeting cards are typically delivered to a recipient by many different methods, e.g. by mail, by hand delivery, etc. Cakes and confections, on the other hand, are typically hand delivered and if delivered through the mail they are accompanied by a greeting card identifying the sender.

SUMMARY OF THE INVENTION

It is therefore an object of the invention to provide an edible greeting card which combines the functions of an event-specific confection and a greeting card.

It is also an object of the invention to provide methods for making an edible greeting card including methods for making a hinge for an edible greeting card, methods for personalizing an edible greeting card, and methods for packaging an edible greeting card.

In accord with these objects which will be discussed in detail below, the edible greeting card of the present invention includes two edible leaves. Each leaf of the card is imprinted with a message and/or design which is suggestive of a celebratory event and each leaf is individually wrapped in clear plastic. The two leaves are coupled to each other by a hinge means which may be formed from a strip of adhesive tape or from a folded cardboard member which embraces an edge of each leaf. The wrapped and hinged leaves are preferably packaged with at least one self-adhesive label upon which the sender may write a personal message and affix the label to one of the leaves. The edible greeting card and the self-adhesive label are preferably packaged in a plastic box which serves as the "envelope" for the greeting card.

Additional objects and advantages of the invention will become apparent to those skilled in the art upon reference to the detailed description taken in conjunction with the provided figures.

BRIEF DESCRIPTION OF THE DRAWINGS

FIG. 5 is an end elevational view of the blank of FIG. 4 in an intermediate stage of folding;

FIG. 6 is an end elevational view of the blank of FIG. 4 after folding and gluing;

DETAILED DESCRIPTION OF THE PREFERRED EMBODIMENTS

Figure 1:
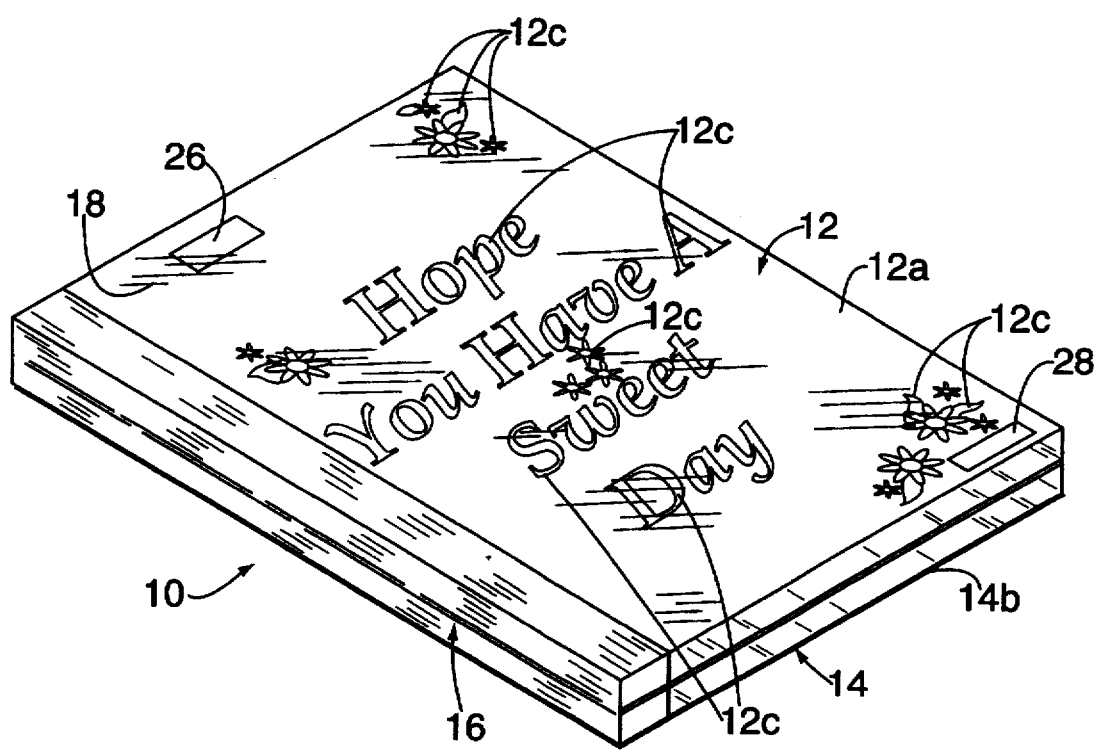
FIG. 1 is a perspective view of a closed edible greeting card according to the invention showing the outer cover leaf.
Figure 2:
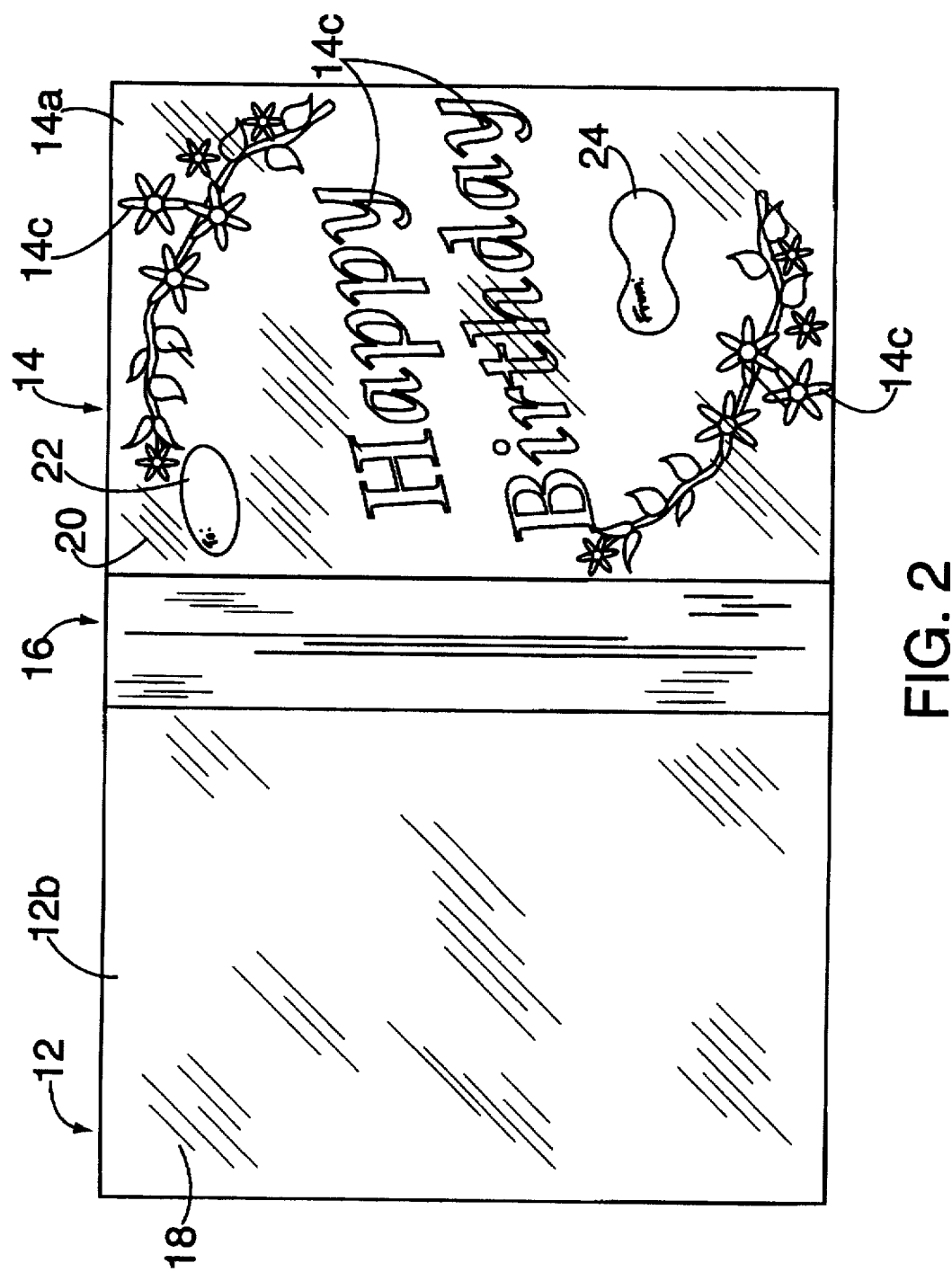
FIG. 2 is a plan view of the edible greeting card of FIG. 1 opened exposing the inner message leaf.

Referring now to FIGS. 1 and 2, an edible greeting card 10 according to the invention includes a first cover leaf 12, a second inner leaf 14, and a hinge 16 which joins the two leaves. Each leaf is substantially rectangular having a first side 12a, 14a and a second side 12b, 14b and is manufactured as a relatively rigid edible confection such as a cookie. The leaves my be any suitable size. However, in a presently preferred embodiment, each leaf is approximately 4.5" by 6.5" by 0.38" thick.

At least the first side 12a, 14a of each leaf is imprinted with a decoration 12c, 14c which may include a combination of words and designs. According to the presently preferred embodiment, both leaves are iced to cover their entire front and back surfaces as well as their edges and only their first sides 12a, 14a are imprinted. The choice of words and designs for imprinting the leaves is drawn from the art of greeting cards and may vary significantly depending on the celebratory event to be specified by the card. The imprinting of the leaves and/or the icing thereof with edible inks may be accomplished by any of the known prior art methods mentioned above.

After each leaf 12, 14 is manufactured and imprinted, it is preferably shrink wrapped in clear plastic 18, 20 before the hinge 16 is attached to the leaves. The hinge 16 may be provided as an adhesive flexible strip of tape which is applied to adjacent edges of the leaves or may be formed from a cardboard blank as described below. The finished edible greeting card is preferably packaged with one or more self-adhesive labels 22, 24 upon which a personal message may be written. The self-adhesive labels 22, 24 may be applied to the plastic shrink-wrap 20 on the imprinted side 14a of the inner leaf 14 as would be consistent with the placement of a personal message in an ordinary greeting card. For commercial purposes, removable indicia 26, 28 may be provided on the plastic shrink-wrap 18 of the cover leaf 12 in order to indicate price, name of manufacturer, etc.

Figure 3:
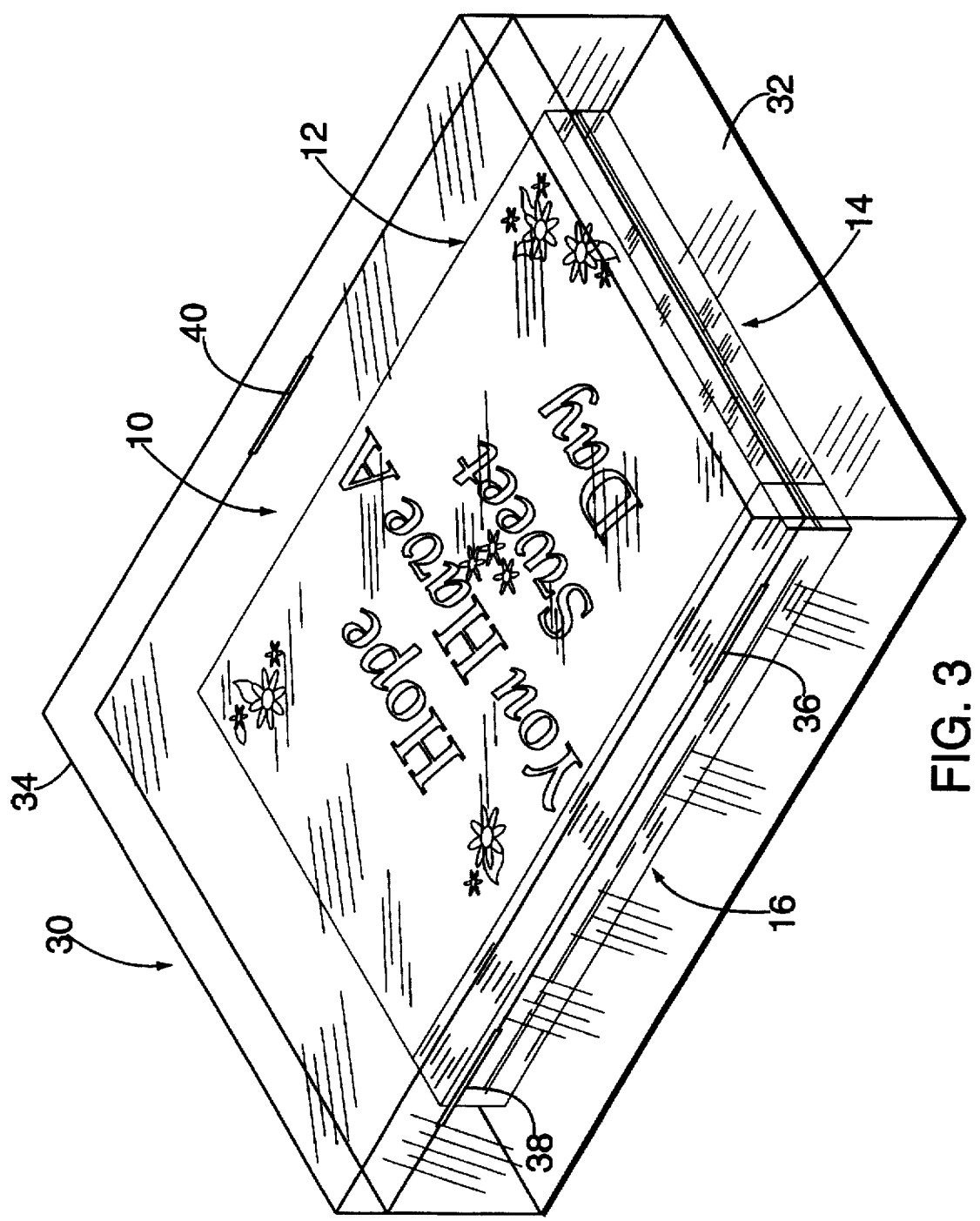
FIG. 3 is a view similar to FIG. 1 of the edible greeting card in a plastic case.

As shown in FIG. 3, the edible greeting card 10 is preferably packaged in a clear plastic box 30 for shipping, display and sale. The box 30 preferably includes a lower portion 32 and an upper door portion 34 which is coupled to the lower portion by a pair of hinges 36, 38, and a closure 40. The plastic box 30 prevents damage to the card 10 during shipping and helps maintain the freshness of the confection. In addition, the box 30 may be used as an "envelope" for the card 10. Alternatively, the card may be packaged in a box that more resembles an envelope such as a white cardboard box or the like.

Figure 4:
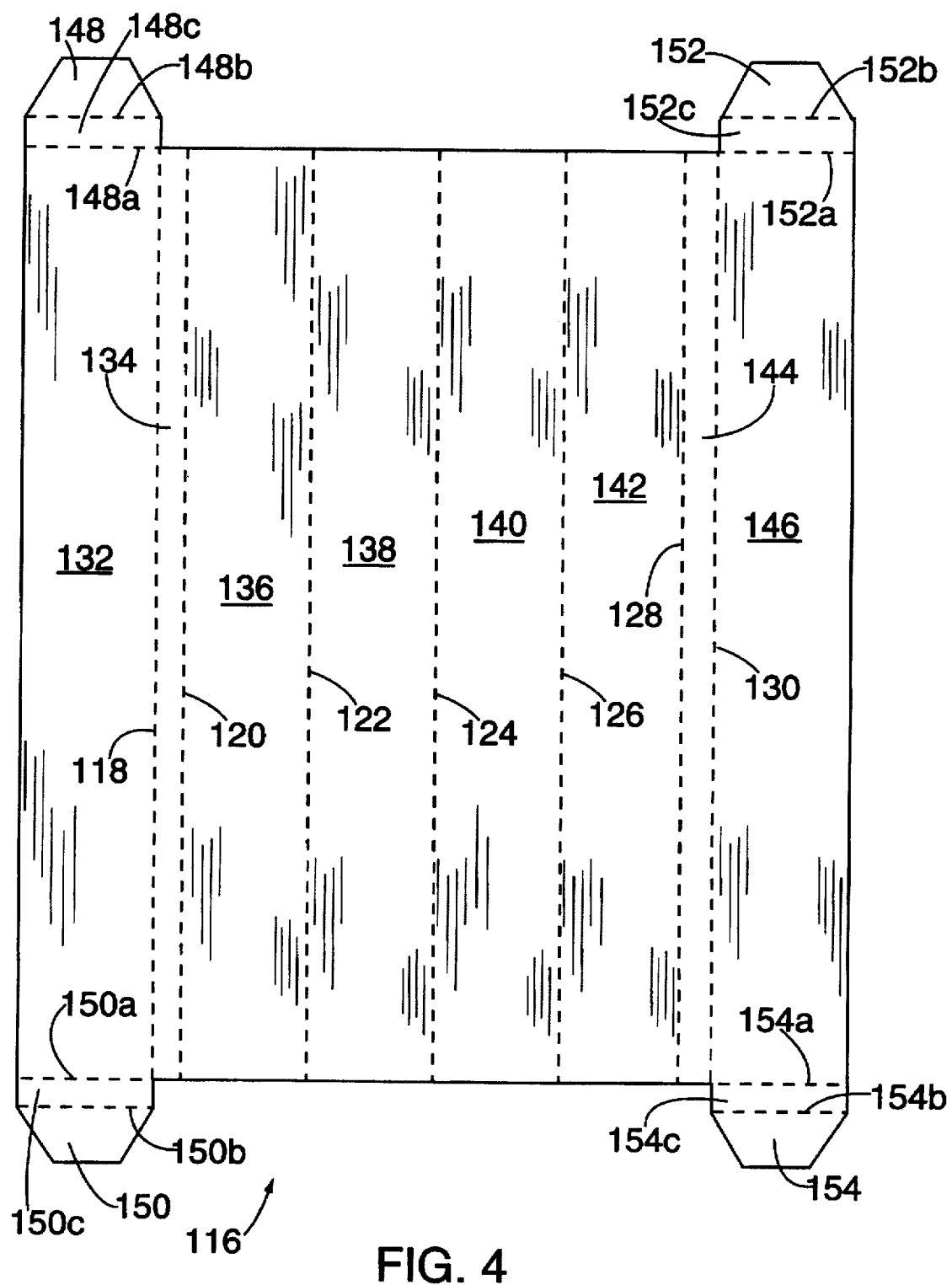
FIG. 4 is a plan view of a cardboard blank which is folded and glued to form a hinge for the two leaves of the edible greeting card.
Figure 7:
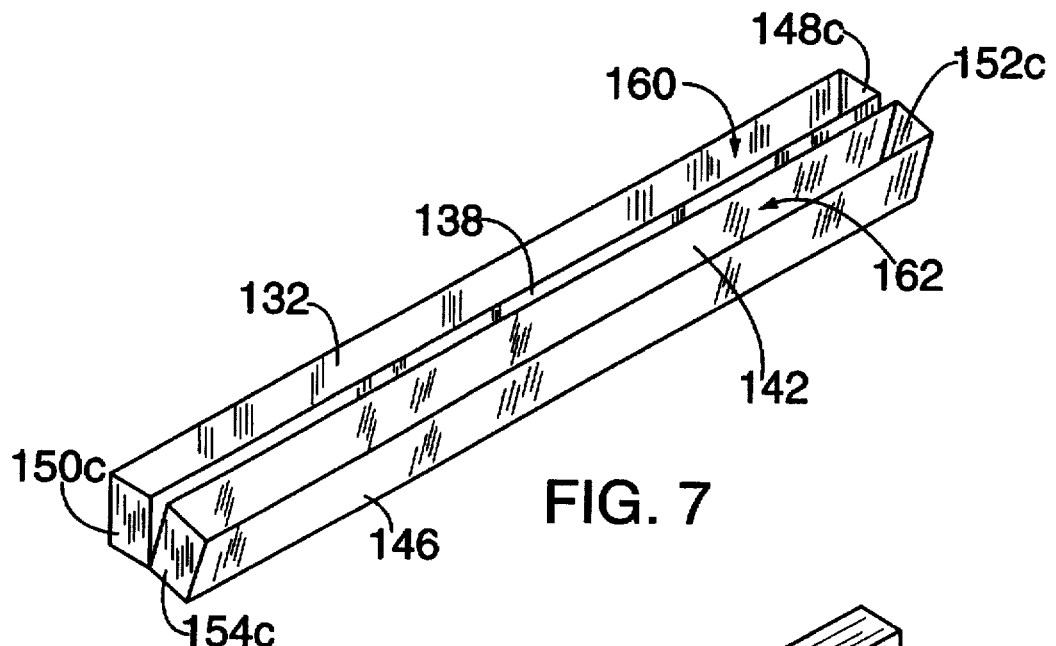
FIG. 7 is a perspective view of the fully constructed hinge made from the blank of FIG. 4.
Figure 8:
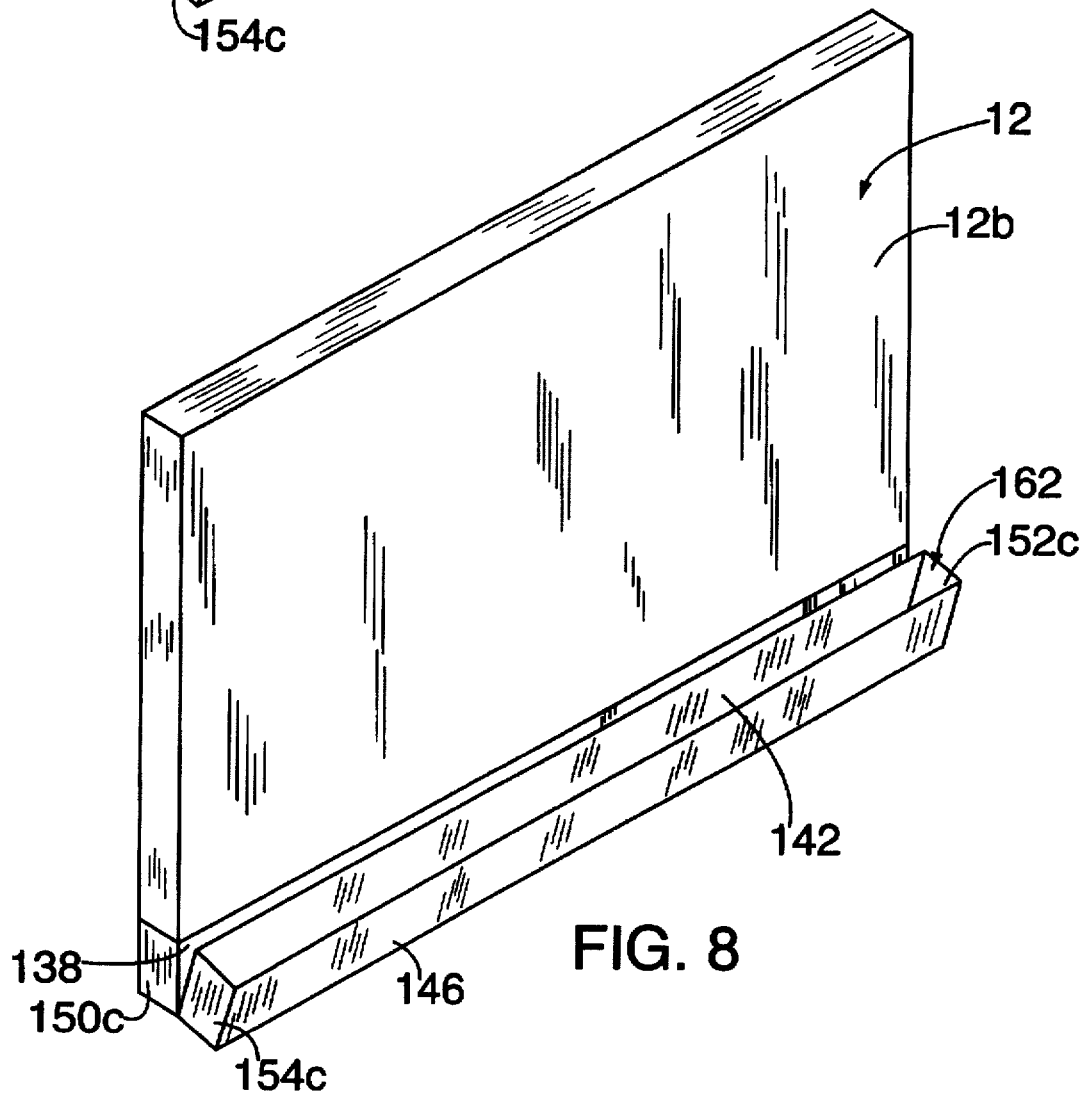
FIG. 8 is a perspective view showing the insert of one of the card leaves into one of the pockets of the hinge.

As mentioned above, the hinge 16 which is used to hold the two leaves 12 and 14 together may be made from a strip of flexible adhesive tape which is applied to the adjacent edges of the leaves as shown. According to the presently preferred embodiment of the edible greeting card, the hinge is made from a folded and glued cardboard blank 116 as seen in FIGS. 4–6.

Turning now to FIGS. 4–8, a cardboard blank 116 is provided as a substantially rectangular sheet with seven parallel fold lines 118–130 which define eight rectangular panels 132–146. The end panels 132, 146 are each provided with a pair of tapered flaps 148, 150 and 152, 154. The flaps are each provided with a pair of fold lines 148a, 148b–154a, 154b which define intervening panels 148c–154c between the flaps and the end panels. The blank 116 is folded as shown in FIGS. 5 and 6 to form two rectangular pockets 160, 162 which are hinged at the fold line 124. More particularly, the rectangular pocket 160 is formed by panels 132, 134, 136, 148c, and 150c. Panel 138 is folded on top of panel 136 and the tabs 148, 150 are inserted into the space between panels 136, 138. Panels 136 and 138, as well as tabs 148, 150 are preferably fixed to each other with non-toxic glue. The rectangular pocket 162 is formed by panels 142, 144, 146, 152c, and 154c. Panel 140 is folded on top of panel 142 and the tabs 152, 154 are inserted into the space between panels 140, 142. Panels 140 and 142, as well as tabs 152, 154 are preferably fixed to each other with non-toxic glue. The blank 116 is dimensioned and the placement of the fold lines is determined according to the dimensions of the leaves 12, 14 described above. The pockets 160, 162 thus formed are dimensioned to accept and embrace the edges of the leaves 10, 12 as seen best in FIGS. 1, 3 and 8. The hinge constructed from the blank 116 may be affixed to the leaves 12, 14 by placing some non-toxic glue in the pockets 160, 162 before inserting the edges of the leaves. Alternatively, the pockets may be suitably dimensioned to provide a friction fit.

There have been described and illustrated herein an edible greeting card, methods of making it, and methods of packaging it. While particular embodiments of the invention have been described, it is not intended that the invention be limited thereto, as it is intended that the invention be as broad in scope as the art will allow and that the specification be read likewise. Thus, while particular dimensions and materials have been disclosed, it will be appreciated that other dimensions and materials could be utilized. Also, while particular hinge means have been shown, it will be recognized that other types of hinges could be used with similar results obtained. Moreover, while particular configurations have been disclosed in reference to self-adhesive labels and a plastic box for the edible greeting card, it will be appreciated that other configurations could be used as well. For example, the wrapping of each leaf of the card could be provided with an opaque portion upon which a personal message can be written. Furthermore, while the edible greeting card has been disclosed as having two rectangular leaves, it will be understood that different numbers and shapes of the leaves can achieve the same or similar function as disclosed herein. It will therefore be appreciated by those skilled in the art that yet other modifications could be made to the provided invention without deviating from its spirit and scope as so claimed.

I claim:
1. An edible greeting card comprising:
    a) a first edible leaf being imprinted with an event-specific message;
    b) a second edible leaf;
    c) a hinge means for coupling said first edible leaf to said second edible leaf, said hinge means being coupled to an edge of said first edible leaf and to an edge of said second edible leaf so that said first and second edible leaves are hingedly coupled to each other.
2. An edible greeting card according to claim 1, wherein: said second edible leaf is imprinted with an event-specific message.
3. An edible greeting card according to claim 1, wherein: said second edible leaf is imprinted with an event-specific design.
4. An edible greeting card according to claim 1, wherein: said first edible leaf is imprinted with an event-specific design.
5. An edible greeting card according to claim 1, wherein: said first and second edible leaves are substantially the same size and shape.
6. An edible greeting card according to claim 1, wherein: said hinge means comprises a strip of adhesive tape.
7. An edible greeting card according to claim 1, wherein: said hinge means comprises a folded cardboard member which embraces said edge of said first leaf and said edge of said second leaf.
8. An edible greeting card according to claim 1, wherein: each of said first and second leaves is individually shrink-wrapped.
9. An edible greeting card according to claim 8, wherein: said hinge means comprises a strip of adhesive tape.
10. An edible greeting card according to claim 8, wherein: said hinge means comprises a folded cardboard member which embraces said edge of said first leaf and said edge of said second leaf.
11. An edible greeting card according to claim 7, wherein: each of said leaves is substantially rectangular.
12. An edible greeting card according to claim 10, wherein: each of said leaves is substantially rectangular.
13. An edible greeting card according to claim 12, wherein: said hinge means is coupled to said leaves by non-toxic glue.
14. An edible greeting card according to claim 1, further comprising:
    d) a self-adhesive label for attachment to one of said leaves upon which a personal message is written.
15. An edible greeting card according to claim 8, further comprising:
    d) a self-adhesive label for attachment to the shrink-wrapping of one of said leaves upon which a personal message is written.
16. An edible greeting card according to claim 1, further comprising:
    e) a plastic box within which said edible greeting card is stored and which functions as an envelope for said edible greeting card.
17. An edible greeting card according to claim 14, further comprising:
    e) a plastic box within which said edible greeting card is stored and which functions as an envelope for said edible greeting card.
18. An edible greeting card according to claim 15, further comprising:
    e) a plastic box within which said edible greeting card is stored and which functions as an envelope for said edible greeting card.
19. An edible greeting card according to claim 15, wherein said self-adhesive label is pressure sensitive.
20. An edible greeting card according to claim 16, further comprising:
    f) a cardboard box within which said edible greeting card is stored and which functions as an envelope for said edible greeting card.

* * * * *